(12) United States Patent
Phelan et al.

(10) Patent No.: US 7,619,979 B2
(45) Date of Patent: Nov. 17, 2009

(54) FAULT ISOLATION IN A NETWORK

(75) Inventors: Thomas G. Phelan, Beaverton, OR (US); Brent W. Yardley, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 10/869,390

(22) Filed: Jun. 15, 2004

(65) Prior Publication Data

US 2005/0276214 A1    Dec. 15, 2005

(51) Int. Cl.
G01R 31/08  (2006.01)

(52) U.S. Cl. .................. 370/242; 370/252

(58) Field of Classification Search .......... 370/216, 370/217, 221, 242, 243, 244, 245; 714/25, 714/48, 49
See application file for complete search history.

(56) References Cited

U.S. PATENT DOCUMENTS

| | | | |
|---|---|---|---|
| 5,157,667 A | 10/1992 | Carusone | 714/45 |
| 5,295,244 A | 3/1994 | Dev | 345/853 |
| 6,697,875 B1 * | 2/2004 | Wilson | 709/245 |
| 6,766,466 B1 * | 7/2004 | Jibbe | 714/4 |
| 6,990,609 B2 * | 1/2006 | Wiley et al. | 714/25 |
| 7,058,844 B2 * | 6/2006 | Wiley et al. | 714/4 |
| 2002/0019870 A1 * | 2/2002 | Chirashnya et al. | 709/224 |
| 2002/0138234 A1 | 9/2002 | Mikal | 702/183 |
| 2002/0194524 A1 * | 12/2002 | Wiley et al. | 714/4 |
| 2003/0149919 A1 * | 8/2003 | Greenwald et al. | 714/43 |
| 2004/0187048 A1 * | 9/2004 | Angamuthu et al. | 714/27 |
| 2004/0193969 A1 * | 9/2004 | Nemoto et al. | 714/100 |
| 2005/0195736 A1 * | 9/2005 | Matsuda | 370/216 |

* cited by examiner

*Primary Examiner*—Seema S Rao
*Assistant Examiner*—Christine Duong
(74) *Attorney, Agent, or Firm*—Lieberman & Brandsdorfer, LLC

(57) ABSTRACT

A system to isolate a fault to a particular port from among multiple ports in a network. The network typically has a plurality of devices including hosts, storage units, and switch groups that intercommunicate via transceivers. A fault indication is received from one or more of the devices in the network. The fault indication is then processed with a chain of fault indication rules that have been linked together into a binary decision path based on a set of device rules and a data flow model for the network. This permits determining the particular port responsible for the fault, and reporting that port to a user of the network.

19 Claims, 5 Drawing Sheets

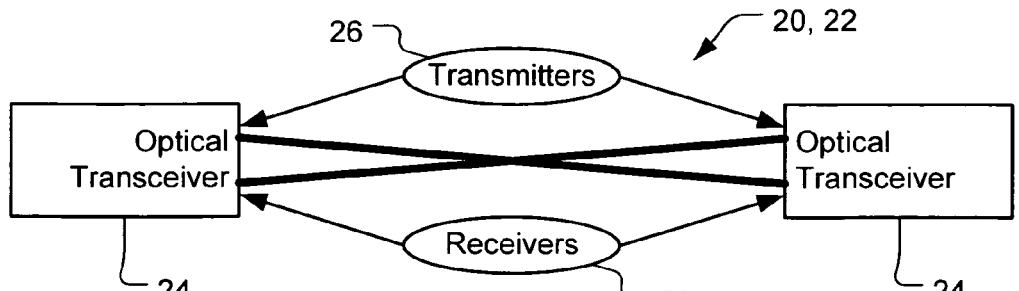
FIG. 3
(background art)
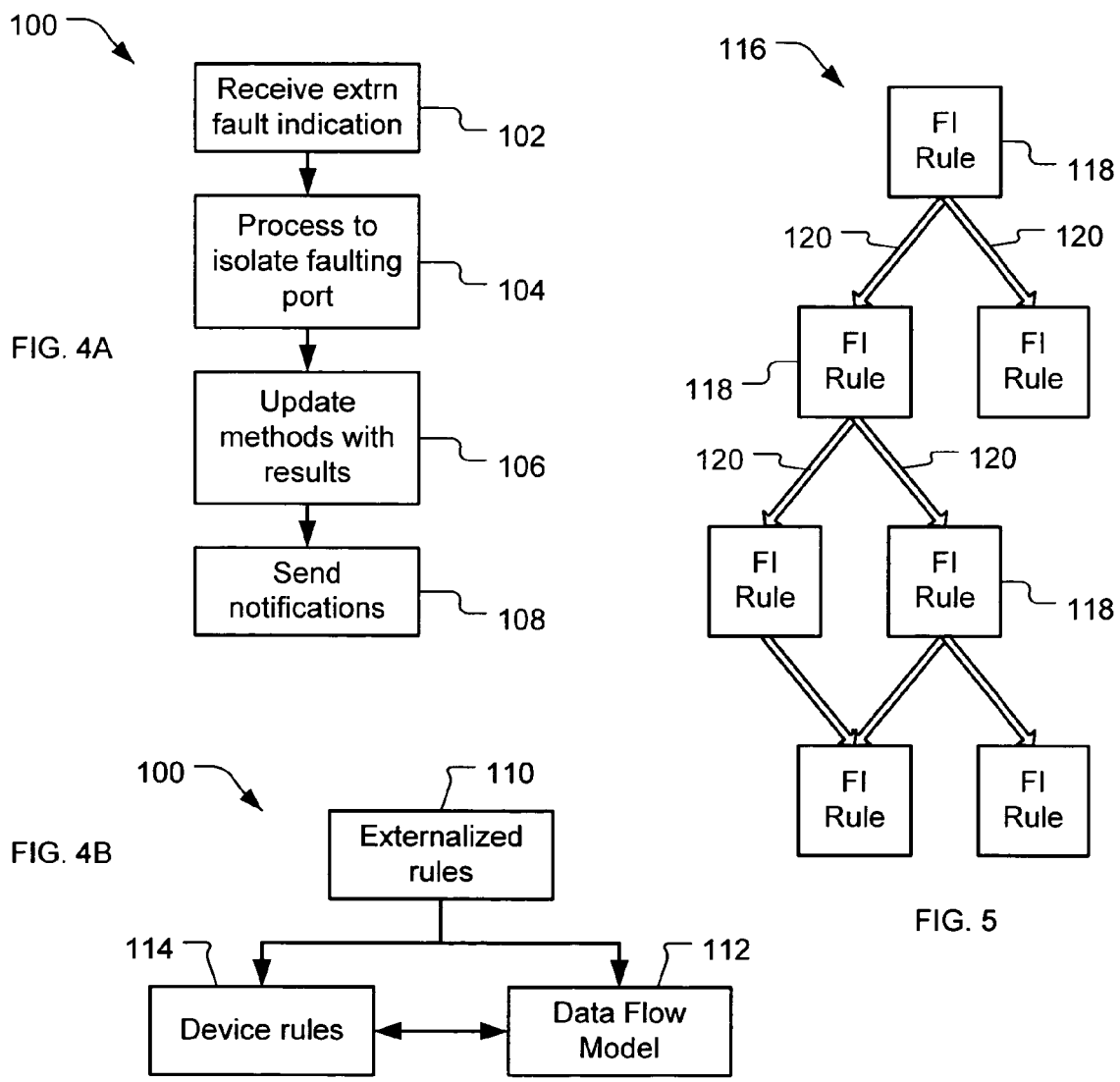
FIG. 4A
FIG. 4B
FIG. 5

FAULT ISOLATION IN A NETWORK

BACKGROUND OF THE INVENTION

1. Field of the Invention

The invention applies to any networking architecture where isolating error occurrences are critical to correctly identifying faulty hardware in the network environment.

2. Description of the Prior Art

As networks continue to become increasingly sophisticated and complex, qualifying fault indications and isolating their sources is becoming a vexing problem. Some devices have services that indicate faults, either ones occurring in the device itself or observed by the device as occurring elsewhere. Other devices, however, may not indicate faults, due to poor design, prioritizing schemes, pass-thru mechanisms that do not permit the discovery of faults that occurred elsewhere, etc. This is further complicated by the wide variety of devices, vendors, models, hardware versions, software versions, classes, etc. The unfortunate result is that no viable way to evaluate fault indications for determination of their operational relevance and root sources in hierarchical or canonical heterogeneous optical networks exists.

FIG. 1 (background art) is a block diagram depicting a generalized storage network infrastructure. This network 10{XE "network 10"} includes blocks representing switch groups 12{XE "switch groups 12"}, hosts 14{XE "hosts 14"}, and storage enclosures 16{XE "storage enclosures 16"}. In a switch group 12{XE "switch group 12"} there can be any number of switches, from 1 to n, containing any number of ports, 1 to m. In some cases these may include a director class switch that all of the other switches are directly connected to, or there may be multiple switches cascaded together to form a pool of user ports, with some ports used for inter-switch traffic and routing (described presently). The hosts 14{XE "hosts 14"} can be of any type from any vendor and having any operating system (OS), and with any number of network connections. The storage enclosures 16{XE "storage enclosures 16"} can be anything from a tape library to a disk enclosure, and are usually the target for input and output (I/O) in the network 10{XE "network 10"}.

Collectively, a single switch group 12{XE "switch group 12"} with hosts 14{XE "hosts 14"} and storage enclosures 16{XE "storage enclosures 16"} are "local devices" that are either logically or physically grouped together at a locality 18{XE "locality 18"}. Some of the devices at a locality 18{XE "locality 18"} may be physically located together and others may be separated physically within a building or a site.

The hosts 14{XE "hosts 14"} are usually the initiators for I/O in the network 10{XE "network 10"}. For communications within a locality 18{XE "locality 18"}, the hosts 14{XE "hosts 14"} and storage enclosures 16{XE "storage enclosures 16"} are connected to the switch group 12{XE "switch group 12"} via local links 20{XE "local links 20"}. For more remote communications, the switch groups 12{XE "switch groups 12"} are connected via remote links 22{XE "remote links 22"}.

In FIG. 1, three localities 18{XE "localities 18"} are shown, each having a switch group 12{XE "switch group 12"}. These localities 18{XE "localities 18"} can be referenced specifically as localities 18a-c{XE "localities 18a-c"}. As can be seen, communications from locality 18a{XE "locality 18a"} to locality 18c{XE "locality 18c"} must go via locality 18b{XE "locality 18b"}, hence making the example network 10{XE "network 10"} in FIG. 1 a multi-hop storage network.

All of the devices in the network 10{XE "network 10"} are ultimately connected, in some instances through optical interfaces in the local links 20{XE "local links 20"} and the remote links 22{XE "remote links 22"}. The optical interfaces include multi mode or single mode optical cable which may have repeaters, extenders or couplers. The optical transceivers include devices such as Gigabit Link Modules (GLM) or GigaBaud Interface Converters (GBIC).

In Fiber Channel Physical and Signaling Interface (FC-PH) version 4.3 (an ANSI standard for gigabit serial interconnection), the minimum standard that an optical device must meet is no more then 1 bit error in $10^{12}$ bits transmitted. Based on 1 Gbaud technology this is approximately one bit error every fifteen minutes. In 2 Gbaud technology, this drops to 7.5 minutes, and in 10 Gbaud technology, to 1.5 minutes. If improvements to the transceivers are made so that the calculation assumes one bit error in every $10^{15}$ bits, at 2 Gbaud, this is approximately one bit error every week. Also, optical fiber in an active connection is never without light, so bit errors can come inside or outside of a data frame and each optical connection has at lease two transceiver modules which doubles again the probability for a bit error. Furthermore, each interface, junction, coupler, repeater, or extender, has the potential of being unreliable, since there are dB and mode losses associated with these connections that degrade integrity of the optical signal and may result in data transmission losses due to the increased cumulative error probabilities.

Unfortunately, determining the sources of errors, and thus determining where corrective measures may be needed if too many errors are occurring in individual sources, can be very difficult. In storage network environments that use cut-through routing technology, an I/O frame with a bit, link or frame level error that has a valid address header can be routed to its destination, forcing an error counter to increment at each hop in the route that the frame traverses. Attempting to isolate where this loss has occurred in a network that may have hundreds of components is difficult and most of the time is a manual task.

All the losses that have been described herein are also "soft" in nature, meaning that, from a system perspective, no permanent error has occurred and there may not be a record of I/O operational errors in a host or storage log. The only information available then is the indication of an error with respect to port counter data, available at the time of the incident.

As networks evolve, the ability to isolate faults in these networks must also evolve as fast. The ability to adjust to this change in storage networking environments needs to come from an external source and to be applied to the network without the need for interruption by the monitoring system that is employed.

FIG. 2 (background art) is a block diagram depicting the generalized multi-hop network 10{XE "network 10"} of FIG. 1 with errors. An error event has occurred on the remote link 22{XE "remote link 22"} shown emphasized in FIG. 2. This could have been a CRC error or other type of optical transmission error. The error here was reported on the two hosts 14{XE "hosts 14"} and the one storage enclosure 16{XE "storage enclosure 16"} which are also shown as emphasized in FIG. 2.

What is needed is a system able to correlate that these three separately recorded events in the network 10{XE "network 10"} were all caused by a single event. And if the event continues, to notify a user of the fact that it was not a host 14{XE "host 14"} or the storage enclosure 16{XE "storage enclosure 16"} that was faulting but, rather one of the paths in the remote link 22{XE "remote link 22"} in the network 10{XE "network 10"}, aside of the hardware at the endpoints within the localities 18{XE "localities 18"}. The proposed system therefore needs to take fault indications and isolates those to the faulting link. A link is described as the relationship between two devices and is shown in the following FIG. 3.

FIG. 3 (background art) is a block diagram depicting a single optical link, comprising two optical transceivers 24{XE "transceivers 24"} and the local link 20{XE "local link 20"} or remote link 22{XE "remote link 22"} connecting them. The cable is depicted as twisted to represent that the transmitter 26{XE "transmitter 26"} of one optical transceiver is connected directly to the receiver 28{XE "receiver 28"} of an opposing optical transceiver. All of the hosts 14{XE "hosts 14"}, storage enclosures 16{XE "storage enclosures 16"}, and switch groups 12{XE "switch groups 12"} have optical transceivers 24{XE "transceivers 24"} connecting the local links 20{XE "local links 20"} and remote links 22{XE "remote links 22"}. There can be any number of paths in these links 20, 22{XE "links 20, 22"} with each path having two directions. For each direction there is one transmitter 26{XE "transmitter 26"} and one receiver 28{XE "receiver 28"}, as represented in FIG. 3.

It is, therefore, an object of the present invention to provide a system for fault isolation in a storage area network. Other objects and advantages will become apparent from the following disclosure.

SUMMARY OF THE INVENTION

Briefly, one preferred embodiment of the present invention is a system and a computer program, embodied on a computer readable storage medium, to isolate a fault to a particular port from among multiple ports in a network. The network typically has a plurality of devices including hosts, storage units, and switch groups that intercommunicate via transceivers. A fault indication is received from one or more devices in the network. The fault indication is then processed with a chain of fault indication rules that are linked together into a binary decision path based on a set of device rules and a data flow model for the network. This permits determining the particular port responsible for the fault, and it permits reporting that port to a user of the network.

It is an advantage of the fault isolation system that it can determine the root source of a fault indication in a hierarchical or canonical heterogeneous optical network, based on a fault indication from an external service such as a predictive failure analysis (PFA), a performance analysis, a device, a link, or a network soft error notification, etc.

It is another advantage of the fault isolation system that it can consider all of the devices and the links between those devices using its fault indication and device rules, to adapt to uniqueness in the various device and counter types provided in a network.

It is another advantage of the fault isolation system that it can take into account differences in an underlying network, such as whether it is a storage area network (SAN) using cut-through routing or a local area network (LAN) using a store and forward scheme.

It is another advantage of the fault isolation system that it can use proven decision making algorithms and binary forward chaining, albeit in a novel manner, to decide whether to report fault indications and to evaluate the effectiveness of its fault isolation techniques.

It is another advantage of the fault isolation system that it can report the results of its fault isolation analysis using different and multiple reporting mechanisms, as desired.

It is another advantage of the fault isolation system that embodiments of it can be optimized through the use of sets of the externalized fault indication rules to directly affect its operation.

It is another advantage of the fault isolation system that embodiments of it can be implemented in modular form and easily adapted for multiple network applications.

It is another advantage of the fault isolation system that embodiments of it can allow loop back or feedback of its fault isolation results to adjust its fault indication and device rules, thus providing for self-optimization.

It is another advantage of the fault isolation system that it can aggregate and group data from multiple external fault indications, to provide a correlated response.

It is another advantage of the fault isolation system that it can take advantage of historical archives, potentially containing hundreds of data values for hundreds of devices, to further analyze the network.

And it is another advantage of the fault isolation system that it can be embodied to handle multiple fault isolations simultaneously, using new instances of its FI rules to follow separate FI chains for each fault isolation case.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIG. 3 (background art) is a block diagram depicting a single optical link, comprising two optical transceivers and the local link or remote connecting them.

FIG. 4A-B are diagrams providing an overview of a fault isolation system in accord with the present invention.

FIG. 5 is a block diagram depicting a binary forward chaining algorithm employed to provide a fault isolation chain (FI chain) of connected instances of fault isolation rules (FI rules).

Figure 6:
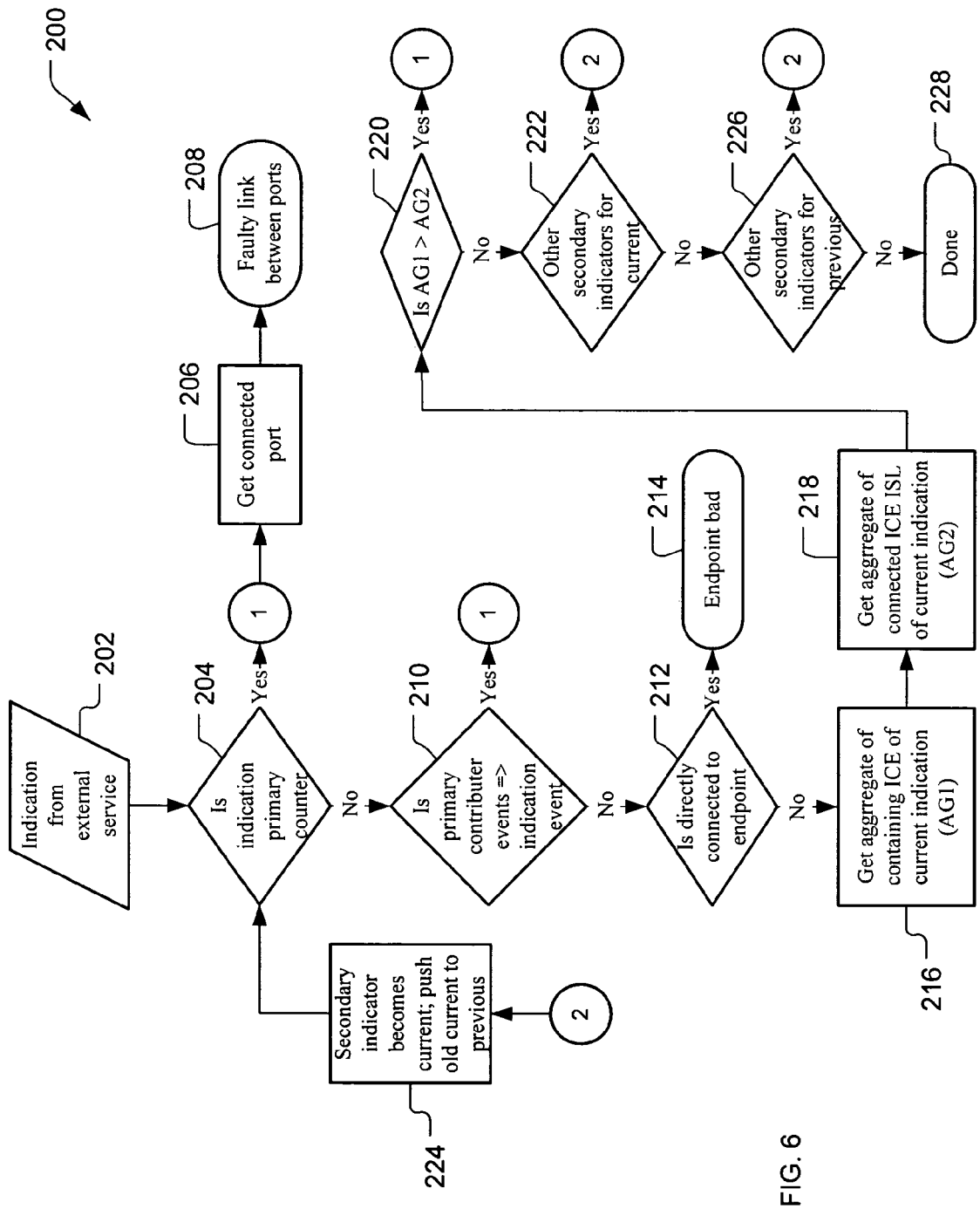

FIG. 6 is a flow diagram of a default FI chain that is usable to isolate a fault on a fiber channel storage network by applying the above FI rules.

Figure 7:
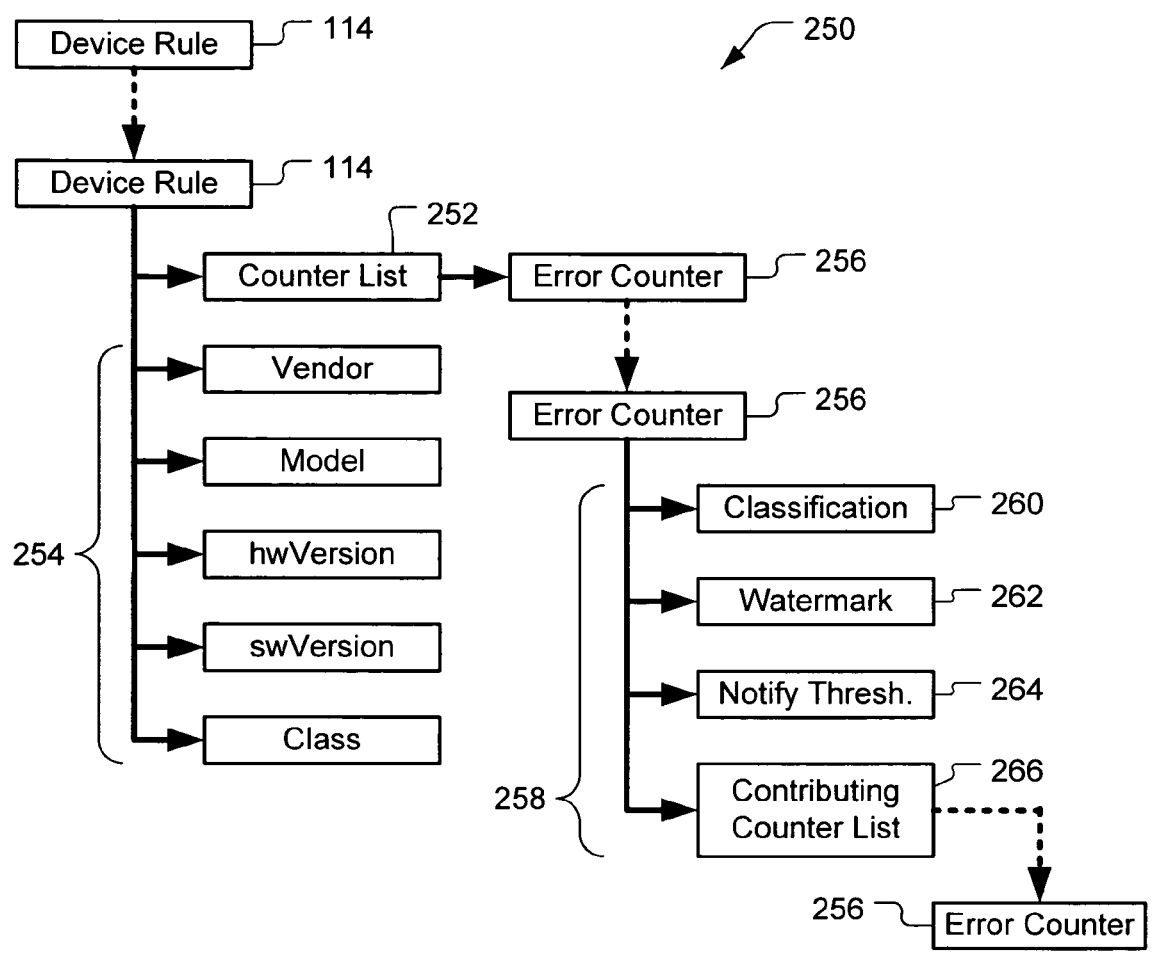

FIG. 7 is a hierarchy diagram for an example set of the external rules used to describe device and error attributes.

Figure 8:
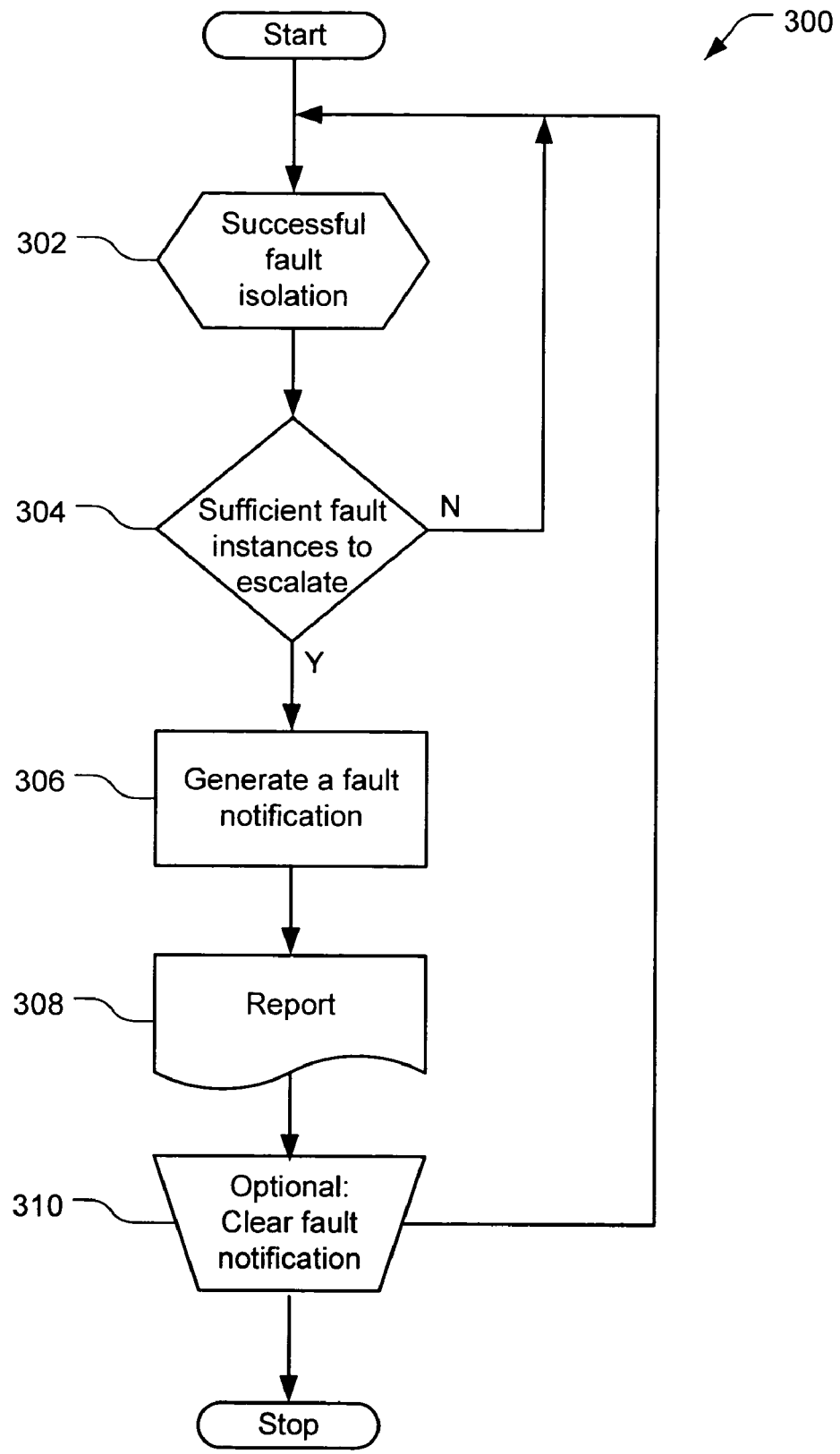

And FIG. 8 is a flow chart summarizing how the fault isolation system follows a state flow.

In the various figures of the drawings, like references are used to denote like or similar elements or steps.

DETAILED DESCRIPTION OF THE PREFERRED EMBODIMENTS

The present invention provides a system for fault isolation in a network. As illustrated in the various drawings herein, and particularly in the views of FIG. 4A-B, embodiments of the invention are depicted by the general reference character 100.

FIG. 4A-B are diagrams providing an overview of a fault isolation system 100 in accord with the present invention. The fault isolation system 100 evaluates the storage area network given network counters, topology, and attribute characteristics, to isolate where one or more faults have occurred, no matter where the origin of the fault.

In FIG. 4A a flowchart shows overall interactions. In a step 102 the fault isolation system 100 reads or receives an external fault indication from one of the externalized hardware or software components in the storage area network. In a step 104 the fault isolation system 100 processes the fault indication to isolate it to a faulting port. In a step 106 the fault isolation system 100 updates its methods with the isolation result, if required. And in a step 108 the fault isolation system 100 sends a notification, if required.

In FIG. 4B a block diagram shows interactions between the major elements of the fault isolation system 100. An externalized rules mechanism 110 works with a data flow model 112 and device rules 114, while the data flow model 112 and device rules 114 further work closely together.

FIG. 5 is a block diagram depicting a binary forward chaining algorithm employed to provide a fault isolation chain (FI chain 116) of connected instances of fault isolation rules (FI rules 118). The FI chain 116 thus is an externalized form of the rules mechanism 110 and the data flow model 112. As can be seen, each FI rule 118 has a binary decision code path 120 in the FI chain 116 that links it to any other FI rule 118. Each FI rule 118 in the FI chain 116 describes a specific classification or analysis, such as a counter definition; correlation to another port or counter; classification, such as whether the error was an optical bit level error or frame error; or aggregation across multiple ports, such as the case with inter-switch links.

In one exemplary implementation, the FI rules 118 are chained together to form the FI chain 116 through the use of an externalized form. Examples of that form are serialized Java objects, XML formatted files, etc. The FI rules 118 can be integrated beforehand, while the FI chains 116 are developed and delivered separately. This allows for delivery of a new FI chain 116 that can easily be dropped into place without the need for byte level updates. Each fault isolation can also be performed with a separate thread, providing the fault isolation system 100 with the ability to handle multiple fault isolations simultaneously. And since every fault isolation can use a new instance of the FI rules 118, each fault isolation can potentially follow a separate FI chain 116.

The following is a list of some example FI rules 118 for use with optical fiber channel networks:

Aggregate Rule: Using multiple possible routing paths, aggregate events across those paths to determine if the fault occurred across one of the remote links 22.

Classify Rule: Using device rules (discussed presently), determine the classification of the error counter type.

Connected Port Rule: Using topology information to identify the active connected port from the current port in the topology.

Event Rule: Calculate the number of significant events that have occurred on a port.

No Fault Rule: Apply a set of user notifications, and log the case if a fault could not be found.

Fault Rule: Apply a set of user notifications, and log the case if a fault could be found.

Secondary Counter Rule: Using a contributing counter list defined for a counter as part of the device rules, obtain the next counter in the list for evaluation.

FIG. 6 is a flow diagram 200 of an example FI chain 116 that is usable to isolate a fault in a SAN that uses fiber channel protocol. This shows the reception of a fault indication from a separate component and the flow that is then taken using the FI rules 118. Each block in the flow diagram 200 represents a separate FI rule 118.

Figure 2:
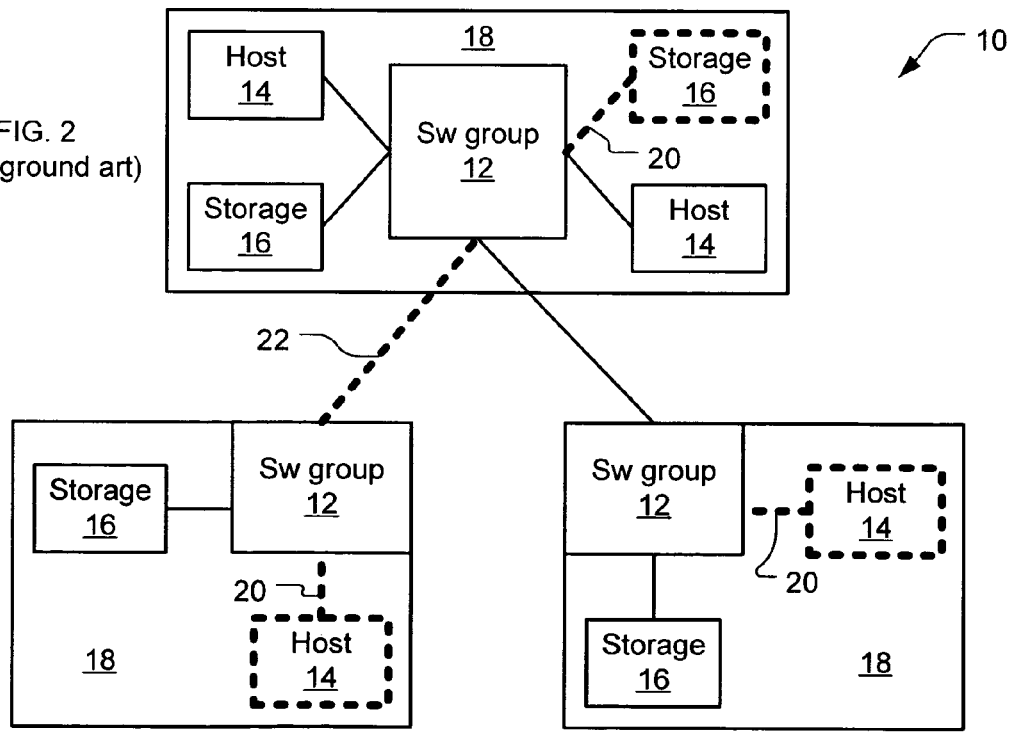
FIG. 2 (background art) is a block diagram depicting the generalized multi-hop network of FIG. 1 with errors.

The flow through the FI chain 116 here starts at a block 202, when a fault indication is received from a service running on a component. For example, with reference again briefly to FIG. 2, the indication could be received from the emphasized storage enclosure 16.

In a block 204, a determination is made whether the fault indication is due to a primary counter exceeding a notify threshold (set as part of a device rule for a particular device, e.g., the emphasized storage enclosure 16). If so ("Yes"), in a block 206 information about the connected port is received and in a block 208 the fact of a faulty link between ports is logged.

Otherwise (i.e., "No" at block 204), at a block 210 a determination is made whether the primary contributing events equal or exceed an indication event threshold. If so ("Yes"), the flow diagram 200 (i.e., the FI chain 116) again employs block 206 and block 208, as described above.

Otherwise (i.e., "No" at block 210), at a block 212 a determination is made whether the reporting device is directly connected to an endpoint. If so ("Yes"), in a block 214 the fact of a faulty endpoint is logged.

Otherwise (i.e., "No" at block 212), at a block 216 the current indication is examined on all ports of the containing interconnect element. This step is also referred to as the step of getting the first aggregate ("AG1") containing an interconnect element (ICE) of the current fault indication. At a block 218 the current indication is examined on all interswitch link on the connected ICE. This is referred to as the step of getting the second aggregate ("AG2") of the connected ICE inter-switch link (ISL) of the current fault indication. [An ICE is one of the switches in a switch group 12 and an ISL is a link that connects two or more switches together in a switch group 12.]

Then, at a block 220, a determination is made whether the first aggregate (AG1) is greater than the second aggregate (AG2). If so ("Yes"), the flow diagram 200 employs block 206 and block 208, as described above.

Otherwise (i.e., "No" at block 220{XE "block 220"}), at a block 222{XE "block 222"} a determination is made whether there is another, secondary indicator for the current fault. If so ("Yes"), the flow diagram 200{XE "flow diagram 200"} employs a block 224{XE "block 224"}, where the (old) current indicator is made a previous indicator and the secondary indicator is made the (new) current indicator. The block 204{XE "block 204"} is then again employed in the flow diagram 200{XE "flow diagram 200"}.

Otherwise (i.e., "No" at block 222{XE "block 222"}), at a block 226{XE "block 226"} a determination is made whether there is another, secondary indicator for the previous fault. If so ("Yes"), the flow diagram 200{XE "flow diagram 200"} again employs block 224{XE "block 224"}, block 204{XE "block 204"}, etc.

And otherwise (i.e., "No" at block 226{XE "block 226"}), at a block 228{XE "block 228"} the flow diagram 200{XE "flow diagram 200"} is done.

Figure 1:
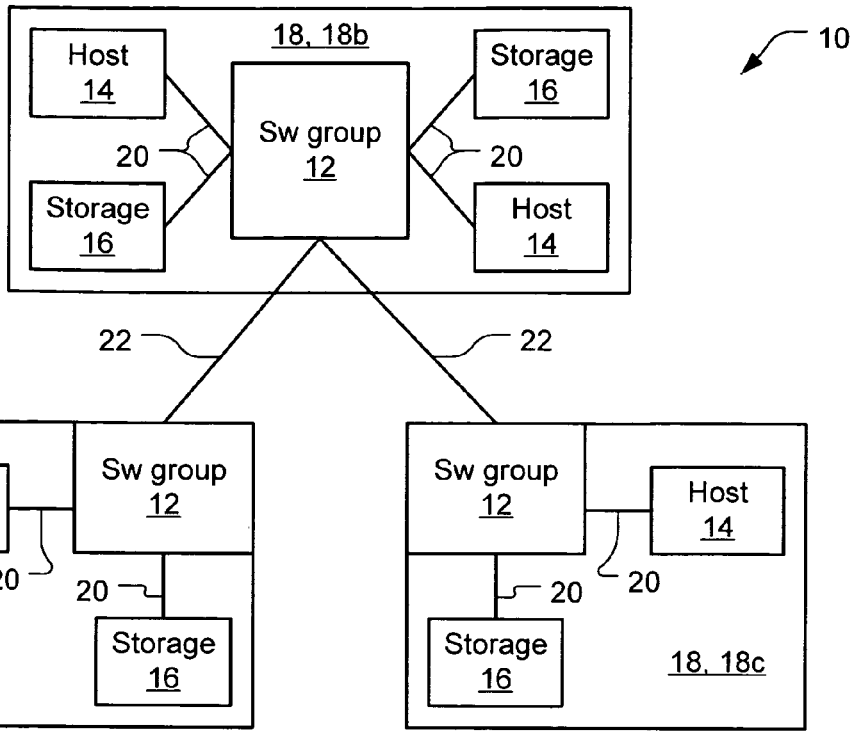
FIG. 1 (background art) is a block diagram depicting a generalized storage network infrastructure.

FIG. 7 is a hierarchy diagram 250{XE "hierarchy diagram 250"} for an example set of the device rules 114{XE "device rules 114"}. The device rules 114{XE "device rules 114"} specify the characterization to, the classification of, and the relationship with a port and the devices it is contained within. With reference again briefly to FIG. 1, "devices" are instances of any equipment in the network 10{XE "network 10"}, such as the switch groups 12{XE "switch groups 12"}, hosts 14{XE "hosts 14"}, and storage enclosures 16{XE "storage enclosures 16"}, and the transceivers 24{XE "transceivers 24"} in these. Those skilled in the present art will appreciate that the network and devices illustrated are merely a few representative examples used for discussion purposes, that the choice of these examples should not be interpreted as implying any limitations, and that other networks and devices are encompassed within the spirit of the present invention.

The device rules 114{XE "device rules 114"} are used by the different FI rules 118{XE "FI rules 118"} to aid in the decision making processes of the fault isolation system 100{XE "fault isolation system 100"}. The device rules 114{XE "device rules 114"} each include a counter list 252{XE "counter list 252"} and attributes 254{XE "attributes 254"}, as shown.

Each device has its own set of device rules 114{XE "device rules 114"}, with the ones chosen to match a particular device by using a best fit model based on a combination of the attributes 254{XE "attributes 254"} (all at first and then decrementing by one until a match is found). For example, the attributes 254{XE "attributes 254"} can include classification, vendor, model, hardware version, and software version. The attributes 254{XE "attributes 254"} thus uniquely identify the device which the device rules 114{XE "device rules 114"} characterize. Preferably all of these attributes 254{XE "attributes 254"} are used, or any number of, and at least one of, to match a device against it's attributes 254{XE "attributes 254"}. This is not necessarily limited to just the attributes 254{XE "attributes 254"} recited above, but rather, these are an example of possible attributes 254{XE "attributes 254"} that can be used to define or match a device.

The counter list 252{XE "counter list 252"} contains a set of error counters 256{XE "error counters 256"}, with each of these also having attributes 258{XE "attributes 258"}, as shown. For example, these attributes 258{XE "attributes 258"} can include a counter classification 260{XE "counter classification 260"}, an indication watermark 262{XE "indication watermark 262"}, a notification threshold 264{XE "notification threshold 264"}, and a list of contributing counters 266{XE "contributing counters 266"}, if there are any.

The counter classification 260{XE "counter classification 260"} can be either primary or secondary. Primary counters are considered those directly related to an error that occurred on a device or port. Secondary counters, although possibly being directly related to the error, can have other error counters 256{XE "error counter 256"} which contribute to the counter list 252{XE "counter list 252"} of the present error counter 256{XE "error counter 256"} being incremented. For instance, a bit level error inside of a frame may cause a CRC corruption. A device may then count both the bit level error and the CRC error in its record of errors on the link. The device rules 114{XE "device rules 114"} can therefore define error counters 256{XE "error counters 256"} that contribute to the present error counter 256{XE "error counter 256"}. The fault isolation system 100{XE "fault isolation system 100"} takes this into consideration during fault isolation. Accordingly, the list of contributing counters 266{XE "contributing counters 266"} specifies additional error counters 256{XE "error counters 256"} that could have contributed to the current error counter 256{XE "error counter 256"} to have an event.

With reference again to FIG. 4A-B, we have now covered the rules mechanism 110{XE "rules mechanism 110"} (i.e., the FI chain 116{XE "FI chain 116"} and the FI rules 118{XE "FI rules 118"}) and the device rules 114{XE "device rules 114"}. The other major component of the fault isolation system 100{XE "fault isolation system 100"} is the data flow model 112{XE "data flow model 112"}. The first operation in the data flow model 112{XE "data flow model 112"} is to take the unique identifying port information, which is the world wide port name in the storage area network, and to lookup information about the port using the attribute data provided by the data provider (embodied in the device rules 114{XE "device rules 114"}). The data flow model 112{XE "data flow model 112"} uses this attribute data to lookup the specific external FI rule 118{XE "FI rule 118"} information about the counter, model, and vendor type of the port involved. This provides the fault isolation system 100{XE "fault isolation system 100"} with the classification, propagation, and correlation data needed to isolate the fault, and topology data provided by the data provider (also embodied in the device rules 114{XE "device rules 114"}) can then be used to follow the relationships between the various devices and to locate the root cause of the fault indication, which may be as simple as a bit level optical error or as complex as a multi-hop propagation error. Historical data archives can also be used to lookup information on the port, possibly leading to isolation based on data collected over past time intervals. The final operation in the data flow model 112{XE "data flow model 112"} is to follow the FI chain 116{XE "FI chain 116"} of externalized FI rules 118{XE "FI rules 118"} provided to result in actual fault isolation.

FIG. 8 is a flow chart summarizing how the fault isolation system 100{XE "fault isolation system 100"} follows a state flow 300{XE "state flow 300"}. After a successful fault isolation using the FI rules 118{XE "FI rules 118"} (step 302{XE "step 302"}), the fault isolation system 100{XE "fault isolation system 100"} upgrades a fault indication to a fault instance (step 304{XE "step 304"}). Each fault instance is tracked based on the port, counter, and device rule 114{XE "device rule 114"} that triggered the initial fault indication. After an appropriate number of fault instances, as defined by the device rules 114{XE "device rules 114"}, the fault isolation system 100{XE "fault isolation system 100"} upgrades a set of fault instances to a fault notification (step 306{XE "step 306"}) that can be reported (step 308{XE "step 308"}). A fault notification indicates that there is a potential failure occurring at a particular port or device. A fault notification can be cleared (optional step 310{XE "step 310"}), and the cleared fault notification can be upgraded back to a fault notification if the above conditions are again met (i.e., steps 302-308{XE "steps 302-308"} are repeated). Of course, various notification rules can also be employed with embodiments of the invention. For instance, using the device rules 114{XE "device rules 114"}, such notification rules can be further used to decide if a fault should be updated to notify a user of a potential failure.

In summary, fault isolation systems in accord with the present invention permit determination of the root sources of fault indications in hierarchical or canonical heterogeneous optical networks. Given a fault indication from an external service such as a predictive failure analysis (PFA), a performance analysis, a device, a link, or a network soft error notification, etc., the fault isolation system 100 is well suited to fill the current and growing need for fault isolation storage area networks.

The fault isolation system can consider all of the devices and the links between those devices using its FI rules and device rules, to adapt to uniqueness in the various device and counter types provided in a network. The fault isolation system can also take into account differences in an underlying network, such as whether it is a storage area network (SAN) using cut-through routing or a local area network (LAN) using a store and forward scheme. For all of this, the fault isolation system can use proven decision making algorithms and binary forward chaining, albeit in novel manner, to decide whether to report fault indications and to evaluate the effectiveness of its fault isolation techniques. The fault isolation system can then report the results of its fault isolation analysis using different and multiple reporting mechanisms, if desired.

As a matter of design implementation, the fault isolation system can be optimized through the use of sets of the externalized FI rules to directly affect its operation. It can be implemented in modular form and easily adapted for multiple network applications. It can easily be extended to allow loop back or feedback of its fault isolation results to adjust its FI rules and device rules, thus providing for self-optimization. It can aggregate and group data from multiple external fault indications, to provide a correlated response. It can also take advantage of historical archives, potentially containing hundreds of data values for hundreds of devices, to further analyze the network. Coincidental with all of this, the fault isolation system can be embodied to handle multiple fault isolations simultaneously, using new instances of its FI rules to follow separate FI chains for each fault isolation case.

The embodiments of the fault isolation system 100{XE "fault isolation system 100"} described above have primarily been discussed using a storage area network (SAN) as an example, but those skilled in the art will appreciate that the present invention is also readily extendable to networks that serve other purposes. Similarly, fiber channel hardware has been used for the sake of discussion. However, this is simply because of the critical need today to improve the reliability and speed of such networks, and the use of this type as the example here facilitates appreciation of the advantages of the present invention. Networks based on non-optical and hybrid hardware are, nonetheless, also candidates were the fault isolation system 100{XE "fault isolation system 100"} will prove useful.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. A method to isolate a fault in a network, the method comprising:
  receiving multiple correlated fault indications from devices in the network, wherein fault indication is a loss of a portion of transmitted information while maintaining routing of data to said device;
  processing said correlated fault indications with a chain of fault indication rules linked together into a binary decision path based on a set of device rules and a data flow model for the network to determine a root cause of said fault indications including using attribute data in said device rules to look up port information selected from the group consisting of: error classification, error propagation, correlation between said ports, and topology data provided by a device provider embodied in said device rules; and
  reporting said root cause to a user of the network, wherein said root cause identifies a faulty link where initial information loss occurred.

2. The method of claim 1, wherein:
said processing includes employing at least one of an aggregate type, a classify type, a connected-port type, an event type, a no-fault type and a secondary-counter type of said fault indication rules.

3. The method of claim 1, wherein:
said fault indication rules are integrated before said chain is present.

4. The method of claim 3, wherein:
said fault indication rules are embodied in an externalized form.

5. The method of claim 3, wherein:
said processing is performed in a separate thread.

6. The method of claim 1, wherein:
said processing includes employing at least one said device rule having an error counter
  and a device attribute that is at least one of device class, vendor, model, hardware version, and software version.

7. The method of claim 6, wherein:
said device rule includes a counter listing of multiple said error counters.

8. The method of claim 1, wherein:
said processing includes employing at least one said device rule having an error counter attribute that is at least one of error classification, error watermark, error notify threshold, and error contributing counter.

9. The method of claim 8, wherein:
said device rule includes an error counter attribute that is a contributing counter listing of multiple contributing error counters.

10. The method of claim 1, wherein:
said information includes identifying port-information that is unique within the network.

11. A system to isolate a fault in a network including one or more hosts, comprising:
  a processor in one said host to receive multiple correlated fault indications from devices in the network, wherein fault indication includes loss of information while maintaining routing of data to said device;
  said processor further to determine a faulty link where initial information loss occurred, by processing instances of said correlated fault indications with a chain of fault indication rules linked together into a binary decision path based on a set of device rules and a data flow model for the network, wherein said data flow model is based upon information about instances of ports selected from the group consisting of: error classification, error propagation, correlation between said ports, topology data embodied in said device rules, and combination thereof; and said processor to report said faulty link to a user of the network.

12. The system of claim 11, wherein:

said processor processes said fault indication rules based on at least one of an aggregate
type, a classify type, a connected-port type, an event type, a no-fault type, a fault
type and secondary-counter type.

13. The system of claim 12, wherein:

said processor determines each instance of said particular port by processing performed
in a separate thread.

14. The system of claim 11, wherein:

said processor processes said device rules that are based on an error counter and a device attribute that is at least one of device class, vendor, model, hardware version, and software version.

15. The system of claim 14, wherein:

said processor processes said device rules that include a counter listing of multiple said error counters.

16. The system of claim 11, wherein:

said processor processes at least one said device rule having an error counter attribute that
is at least one of error classification, error watermark, error notify threshold, and
error contributing counter.

17. The system of claim 16, wherein:

said processor processes at least one said device rule that includes an error counter attribute that is a contributing counter listing of multiple contributing error counters.

18. The system of claim 11, wherein:

said processor processes to determine said instances of said particular port said data flow model by looking up information about instances of said ports using attribute data in said device rules.

19. A method to isolate a fault to a particular link among a plurality of links in a storage area network (SAN), wherein the SAN has a plurality of devices including hosts, storage units, and switch groups that intercommunicate via optical transceivers, the method comprising:

receiving multiple correlated recorded fault indications from at least one said device in the SAN, wherein said fault indications are associated with loss of information while maintaining routing of data to said device in receipt of said fault;

wherein said fault indications are provided only through device port counters and are absent from an error log;

processing said correlated fault indications to determine a faulty link where initial information loss occurred based on a chain of fault indication rules linked together into a binary decision path, wherein said fault indication rules are based on a set of device rules and a data flow model for the SAN, including using attribute data in said rules to look up port information instances selected from the group consisting of: error classification, error propagation, correlation between said ports, topology data embodied in said device rules, and combinations thereof; and reporting said faulty link port to a user of the SAN.

* * * * *

UNITED STATES PATENT AND TRADEMARK OFFICE
CERTIFICATE OF CORRECTION

| | | |
|---|---|---|
| PATENT NO. | : 7,619,979 B2 | Page 1 of 1 |
| APPLICATION NO. | : 10/869390 | |
| DATED | : November 17, 2009 | |
| INVENTOR(S) | : Phelan et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1021 days.

Signed and Sealed this

Twenty-sixth Day of October, 2010

David J. Kappos
*Director of the United States Patent and Trademark Office*